US009135826B2

(12) United States Patent
Malhotra

(10) Patent No.: US 9,135,826 B2
(45) Date of Patent: Sep. 15, 2015

(54) COMPLEX EVENT PROCESSING FOR MOVING OBJECTS

(71) Applicant: SAP AG, Walldorf (DE)

(72) Inventor: Baljeet Singh Malhotra, Burnaby (CA)

(73) Assignee: SAP SE (DE)

( * ) Notice: Subject to any disclaimer, the term of this patent is extended or adjusted under 35 U.S.C. 154(b) by 149 days.

(21) Appl. No.: 13/727,582

(22) Filed: Dec. 26, 2012

(65) Prior Publication Data

US 2014/0180566 A1 Jun. 26, 2014

(51) Int. Cl.
*G08G 3/02* (2006.01)
*G01S 17/10* (2006.01)
*G06Q 10/08* (2012.01)

(52) U.S. Cl.
CPC ........................................ *G08G 3/02* (2013.01)

(58) Field of Classification Search
CPC ........... G08G 3/00; G08G 3/02; G08G 5/065; G08B 21/12; G01C 21/22; G01C 21/00; G06Q 10/08; G06Q 40/08; H04W 88/08; B60L 30/00; B60L 11/1881; G01S 5/0072; G01S 17/10; G01S 17/93; G01S 13/9307
USPC ...................... 701/300, 409, 301, 21; 342/41; 340/541, 971, 989, 985; 455/3.02; 705/4
See application file for complete search history.

(56) References Cited

U.S. PATENT DOCUMENTS 5,969,665 A * 10/1999 Yufa .............................. 342/41
8,594,866 B1 * 11/2013 Chen et al. ...................... 701/21
2002/0138200 A1 * 9/2002 Gutierrez ...................... 701/301
2007/0264930 A1 * 11/2007 Daoudal ...................... 455/3.02
2009/0167592 A1 * 7/2009 Kao et al. ........................ 342/41
2009/0207020 A1 * 8/2009 Garnier et al. ................ 340/541
2011/0128162 A1 * 6/2011 Klepsvik ....................... 340/985
2011/0144912 A1 * 6/2011 Lee et al. ...................... 701/301
2011/0153367 A1 * 6/2011 Amigo et al. ..................... 705/4
2011/0215948 A1 * 9/2011 Borgerson et al. ............ 340/989
2012/0200433 A1 * 8/2012 Glover et al. ................. 340/971
2012/0290200 A1 * 11/2012 Kabel et al. ................... 701/409

OTHER PUBLICATIONS

Floris Goerlandt et al., Traffic Simulation Based Ship Collision Probability Modeling, Reliability Engineering and System Safety, Sep. 22, 2010, pp. 91-107, Elsevier Ltd., Finland.
Ming-Cheng Tsou, Discovering Knowledge from AIS Database for Application in VTS, The Journal of Navigation, 2010, pp. 449-469, vol. 63, No. 3, The Royal Institute of Navigation.
Tang Cunbao et al., Data Mining Platform Based on AIS Data, International Conference on Transportation Engineering, ICTE 2009, pp. 4465-4470, ASCE.
B. Ristic et al., Statistical Analysis of Motion Patterns in AIS Data: Anomaly Detection and Motion Prediction, Commonwealth of Australia, pp. 40-46, Australia.

* cited by examiner

*Primary Examiner* — Tuan C. To
*Assistant Examiner* — Yuri Kan
(74) *Attorney, Agent, or Firm* — Horizon IP Pte. Ltd.

(57) ABSTRACT

Described herein is a technology for facilitating complex event processing for moving objects. In some implementations, data associated with moving objects is received from multiple data sources. One or more constraints associated with an event-of-interest are determined. The event-of-interest that satisfies the one or more constraints is detected based on the data. A notification of the detected event-of-interest may then be sent. For purposes of illustration, some specific complex event processing scenarios based on maritime vessels have been presented to demonstrate the capabilities of the present framework.

20 Claims, 13 Drawing Sheets

300

COMPLEX EVENT PROCESSING FOR MOVING OBJECTS

TECHNICAL FIELD

The present disclosure relates generally to complex event processing for moving objects.

BACKGROUND

Monitoring the activities of moving objects is important for detecting safety, security and compliance irregularities. For example, in the maritime industry, crew members, vessels (e.g., container ships, tankers, passenger ships, bulk carriers, cargo ships, etc.) and commodities worth billions of dollars are constantly on the move. Various threats and illegal activities, such as terrorism, piracy, oil smuggling, drugs and human trafficking, counterfeiting, poaching, illegal fishing and environmental hazards can take place in port waters and can affect regular day-to-day port operations, resulting in human and financial losses. These suspicious activities around moving objects (e.g., maritime vessels) must be detected and reported in real time as soon as possible.

Since maritime safety and security is of great concern to many stakeholders, such as port authorities, shipping, insurance and logistics companies, freight forwarders, the International Maritime Organization's International Convention for the Safety of Life at Sea requires an automatic identification system (AIS) to be fitted aboard international voyaging ships with gross tonnage (GT) of 300 or more tons, and all passenger ships regardless of their size. The AIS is an automatic tracking system that is used to identify and locate vessels by electronically exchanging data with other nearby vessels and AIS base stations. AIS-equipped vessels can be tracked by AIS base stations located along coast lines or, when out of range of terrestrial networks, through satellites fitted with special AIS receivers.

However, due to the enormous volume of traded commodities, large number and size of maritime vessels and complexity of maritime operations, tracking and monitoring the activities of maritime vessels is not a trivial task. Currently, there does not appear to be a complex event processing system that can automatically and efficiently manage the large streams of AIS and other sensor data for maritime safety and security. The lack of a readily available system that can automatically detect maritime anomalies (or complex events) based on ships' navigational behavior can lead to a loss of revenue and reputation, inefficiency of port operations, increase in cost of maritime transportation, non-compliance of regulations and laws, and so forth.

Thus, a need exists for systems, methods, and apparatuses to address the shortfalls of current technology, and to provide other new and innovative solutions.

SUMMARY

In accordance with one aspect, a framework for facilitating complex event processing of moving objects is described herein. Data associated with moving objects is received from multiple data sources. In addition, one or more constraints associated with an event-of-interest are determined. Based on the received data, the present framework detects the event-of-interest that satisfies one or more of these constraints. Upon detecting the event-of-interest, the present framework then sends a notification of the detected event-of-interest.

In accordance with another aspect, a framework for detecting a constant brushing event is presented. Navigational reports associated with at least two vessels are received. Based on the navigational reports, a domain and trajectory for each vessel is computed. A brushing incident is then determined by detecting an intersection of the domains of the two vessels along the trajectories.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

Figure 1:
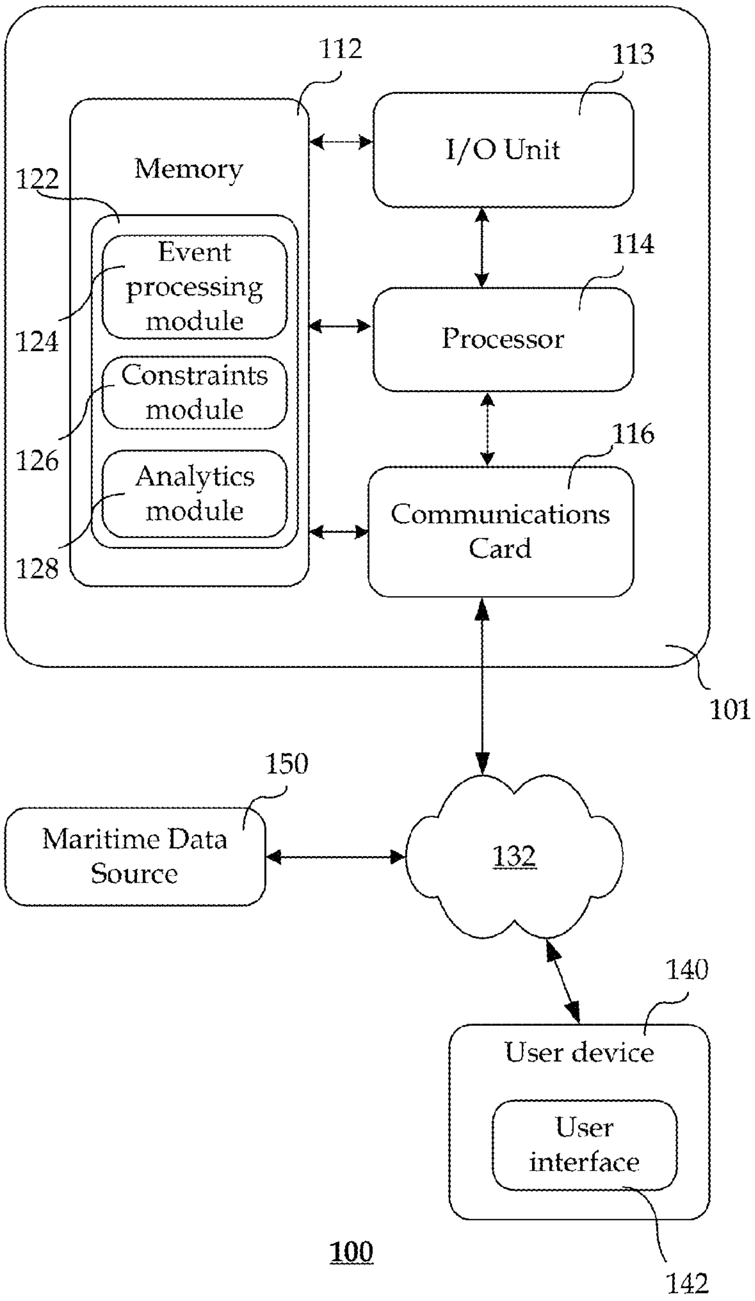
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Systems, methods, and apparatuses for facilitating complex event processing of moving objects are described herein. In one aspect of the present framework, data streams produced by moving objects are managed, processed and analyzed to detect and/or report any events-of-interest or anomalies that can affect the interests of one or more stakeholders. An "event-of-interest" generally refers to an occurrence that has been identified for further study or investigation. An event-of-interest may be, for instance, an anomaly that violates a rule, regulation or law governed by a concerned authority or law enforcement agency. In the maritime industry, for example, due to the inherent nature of the maritime moving objects, non-compliance of safety and security standards are a major source of anomalies that may cause severe problems, such as accidents and illegal trading that can result in the loss of revenue and assets of many businesses.

Exemplary events-of-interest that may be automatically detected by the present framework include ambiguous identification of vessels, sudden changes in speed and halting at unusual locations, unauthorized entry in restricted areas, etc. Such events-of-interest may be indicators of more severe problems or threats, such as attacks on the infrastructure (e.g., terrorism, acts of war, etc.), sovereignty infringement or regulatory infraction, illegal fishing, trafficking (e.g., weapons, drugs, humans, etc.), smuggling, illegal immigration, piracy, attack on a high value vessel, illegal intelligence gathering, unknown and hidden agendas, and so forth.

In accordance with one aspect of the present framework, events-of-interest are detected based on both static and dynamic data to facilitate better decision-making. Static data generally refers to data that does not change over time, such as the ship's size, capacity, type, geographical information, etc. Dynamic data refers to data that changes over time, such as the ship's current location, speed-on-ground (SOG), rate-of-turn (ROT), weather conditions, etc. The data may be obtained from heterogeneous data sources, such as the AIS, a client server (e.g., Internet server), a global positioning system (GPS), radar system, hydrological data source, meteorological data source, and so forth. Another aspect of the present framework is the real-time processing of the massive amounts of data generated by the moving objects to detect events-of-interest as soon as possible. This may be achieved by using an in-memory database to efficiently manage live data streams. These, and other exemplary features, will be discussed in more details in the following sections.

For purposes of illustration, the present framework is described in the context of maritime moving objects. However, it should be noted that the present framework may also be applied to other moving objects, such as ground transport vehicles (e.g., cars, taxis, trucks, etc.) and aircrafts (e.g., airplanes, helicopters, etc.).

FIG. 1 is a block diagram illustrating an exemplary system 100 that implements the framework described herein. The system 100 generally includes a server 101, a user device 140 and a maritime data source 150, at least some of which are connected to a network, e.g., the Internet 132. Although shown as a single machine, the server 101 may include more than one server, such as a server pool. Two or more user devices 140 and/or maritime data sources 150 may also operate in the system 100. The server 101 may be implemented from a website or cloud, and deliver content to one or more applications.

Turning to the server 101 in more detail, it may include a non-transitory computer-readable media or memory 112, a processor 114, an input-output (I/O) unit 113 and a communications card 116. Non-transitory computer-readable media or memory 112 may store machine-executable instructions, data, and various software programs, such as an operating system (not shown), web services, an event processing system 122 for implementing the techniques described herein, all of which may be executable by processor 114. As such, the server 101 is a general-purpose computer system that becomes a specific purpose computer system when executing the machine-executable instructions. Alternatively, the event processing system 122 described herein may be implemented as part of a software product or application, which is executed via the operating system. The application may be integrated into an existing software application, such as an add-on or plug-in to an existing application, or as a separate application. The existing software application may be a suite of software applications. It should be noted that the event processing system 122 may be hosted in whole or in part by different computer systems in some implementations. Thus, the techniques described herein may occur locally on the server 101, or may occur in other computer systems and be reported to server 101.

Each software program may be implemented in a high-level procedural or object-oriented programming language (e.g., C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In accordance with one implementation, the event processing system 122 includes an event processing module 124, a constraints module 126 and an analytics module 128. It should be noted the functionalities of such modules may also be implemented in fewer or additional modules. The event processing module 124 may serve to interface with other components, such as the user device 140 and the maritime data source 150, to receive and aggregate data, including static and dynamic data.

The constraints module 126 may serve to interact with, for example, the user device 140 to pre-define fixed and/or real-time constraints (or rules). Such constraints may represent important criteria for detecting events-of-interest. For example, the constraints may be defined based on an access control policy (e.g., restriction or prohibition). Other types of constraints may also be useful. Various types of access control policies may be implemented. For example, the access control policy may include a limitation on access during pre-specified time periods. Such access control policy may be useful for detecting an oil tanker that is moving towards a particular part of a port that should be accessed only during restricted time periods. The access control policy may also include a limitation on the type of vessel that may enter a pre-specified region. Such access control policy may be useful for detecting, for instance, a civilian vessel entering a restricted zone that should be accessed only by military vessels. Based on the constraints retrieved from the constraints module 126, the analytics module 128 may process the received data to detect the occurrence events-of-interest (or anomalies) that violate these constraints. Reports on detected events-of-interest may then be generated and sent to the respective user device 140. These and other exemplary features will be described in more details in the following section.

Turning back to the memory 112, it may include any memory or database module for storing data and program instructions. Memory 112 may take the form of volatile or non-volatile memory including, without limitation, magnetic media, optical media, random access memory (RAM), read-only memory (ROM), removable media, or any other suitable local or remote memory component. Memory 112 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 101.

In some instances, memory 112 can function as an in-memory database to allow seamless access to and propagation of high volumes of data in real-time. Parallel processing may further be achieved by using a multicore processor 114 in conjunction with the in-memory database. The in-memory database is a database management system that relies primarily on a system's main memory for efficient computer data storage and processing. More particularly, the data in the in-memory database resides in volatile memory or Random Access Memory (RAM) for extremely fast data processing. Typically, this allows the data to be instantly accessed at a speed of several megabytes per millisecond. The data may be persistently stored on a hard drive only as a backup database.

Column-based data storage may further be implemented in the in-memory database, where data tables are stored as columns of data, in sequence and in compressed memory blocks. This facilitates faster aggregation of data when calculations are performed on single columns (e.g., geographical coordinate information). Alternatively, row-based data storage is also possible. In some implementations, instead of updating entire rows, only fields that have changed will be updated. This avoids having to lock entire data tables during updates to prevent conflicting modifications to a set of data. High levels of parallelization may be achieved, which is critical to real-time processing of live data streams and performing constant and substantially simultaneous updates.

Server 101 may be communicatively coupled to an input device (e.g., keyboard, touch screen or mouse) and a display device (e.g., monitor or screen) via the I/O unit 113. In addition, Server 101 may also include other devices such as a communications card 116 or device (e.g., a modem and/or a network adapter) for exchanging data with a network using communication links (e.g., a telephone line, a wireless network link, a wired network link, or a cable network), and other support circuits (e.g., a cache, power supply, clock circuits, communications bus, etc.). In addition, any of the foregoing may be supplemented by, or incorporated in, application-specific integrated circuits.

Server 101 may operate in a networked environment using logical connections to one or more user devices 140 and maritime data sources 150 over one or more intermediate networks 132. These networks 132 generally represent any protocols, adapters, components, and other general infrastructure associated with wired and/or wireless communications networks. Such networks 132 may be global, regional, local, and/or personal in scope and nature, as appropriate in different implementations. The network 132 may be all or a portion of an enterprise or secured network, while in other instances, at least a portion of the network 132 may represent a connection to the Internet. In some instances, a portion of the network may be a virtual private network (VPN). The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the World Wide Web (Internet), and/or any other communication system or systems at one or more locations.

In general, user device 140 may be any computing device operable to connect to or communicate with at least the server 101 and/or the maritime data source 150. In some implementations, user device 140 is a mobile device that may be used by an end-user to communicate information using radio technology. The user device 140 may be a cellular phone, personal data assistant (PDA), smartphone, laptop, tablet personal computer (PC), e-reader, media player, a digital camera, a video camera, Session Initiation Protocol (SIP) phone, touch screen terminal, enhanced general packet radio service (EG-PRS) mobile phone, navigation device, an email device, a game console, any other suitable wireless communication device capable of performing a plurality of tasks including communicating information using a radio technology, or a combination of any two or more of these devices.

The user device 140 may include an input device, a display, a processor, a memory or non-transitory computer-readable media, an interface card, and so forth. In some implementations, the memory stores a user interface 142. The user interface 142 may be, for example, a mobile client that facilitates the exchange of information (e.g., detected events-of-interest) between various users using a mobile platform. The user interface 142 may be written in any programming language, such as a C, C++, Java, Visual Basic, assembler, Perl, any suitable version of 4GL, as well as others.

Various types of users may interact with user interface 142 to communicate information to the server 101. For example, a domain expert user (e.g., law enforcement personnel) may interact with the user interface 142 to define criteria (or constraints) for detecting one or more events-of-interest. The criteria may be stored and/or managed by the constraints module 126. An event-of-interest generally refers to an activity of a moving object that has been identified as an anomaly based on a criteria, rule or constraint. The event-of-interest may be an indicator of a violation or non-compliance of an applicable law, regulation (e.g., environmental regulations, maritime law enforcement agency regulations, etc.) and/or treaty obligation (e.g., UN Convention on the Law of the Sea, maritime boundary treaties between countries, etc.).

The event-of-interest may also be a precursor to an undesirable incident in the absence of a preventive measure. For example, an exemplary event-of-interest may indicate that a vessel has entered a zone of shallow water, as determined based on hydrological data. Such event may be a precursor to the undesirable incident of the vessel running aground an underwater obstacle if no preventive measure (e.g., turning back or changing course) is taken to avoid it. In another example, the event-of-interest may indicate that a vessel is heading towards a particular location. Based on weather advisory reports, fog conditions may be expected at that location. If no preventive measure is taken, the vessel may be stalled by reduced visibility.

In some instances, a field inspector or other user may interact with the user interface 142 to receive notifications of events-of-interest detected by the server 101. The type of notifications may be customized according to, for example, the user's roles (e.g., job assignment, position in organization) and associated privileges to access information, as well as user's preferences. In other instances, a management user may interact with the user interface 142 to receive reports (e.g., summaries, charts, etc.) of events-of-interest detected by the server 101. Such reports may also be customized according to the individual user's preferences, management role or job assignment. These and other exemplary features will be described in more detail later.

The maritime data source 150 may be any electronic computer device operable to receive, transmit, process, and store appropriate data associated with the system 100 of FIG. 1. Although shown as a single device, the maritime data source 150 may be embodied as multiple devices. The maritime data source 150 may be, for example, a server (e.g., database server, web server, etc.), a sensor (e.g., AIS receiver, radar system, GPS, sensor on board, etc.), a personal computer, a desktop, a laptop, a touch screen terminal, a workstation, a network computer, and so forth. One or more processors within these or other devices, or any other suitable processing device, and typically includes many or all of the elements described above relative to server 101. The maritime data source 150 may also include one or more instances of non-transitory computer readable storage media or memory devices (not shown).

Generally, the maritime data source 150 serves to acquire or provide maritime data associated with moving vessels (or objects) that may be processed by the server 101 to detect events-of-interest. The maritime data may be static (i.e. does not change over time) and/or dynamic (i.e. changes over time). In some implementations, various types of maritime data sources 150 are used to provide different types of static and/or dynamic maritime data to facilitate better decision-making. These and other exemplary features will be described in more detail in the following sections.

Figure 2:
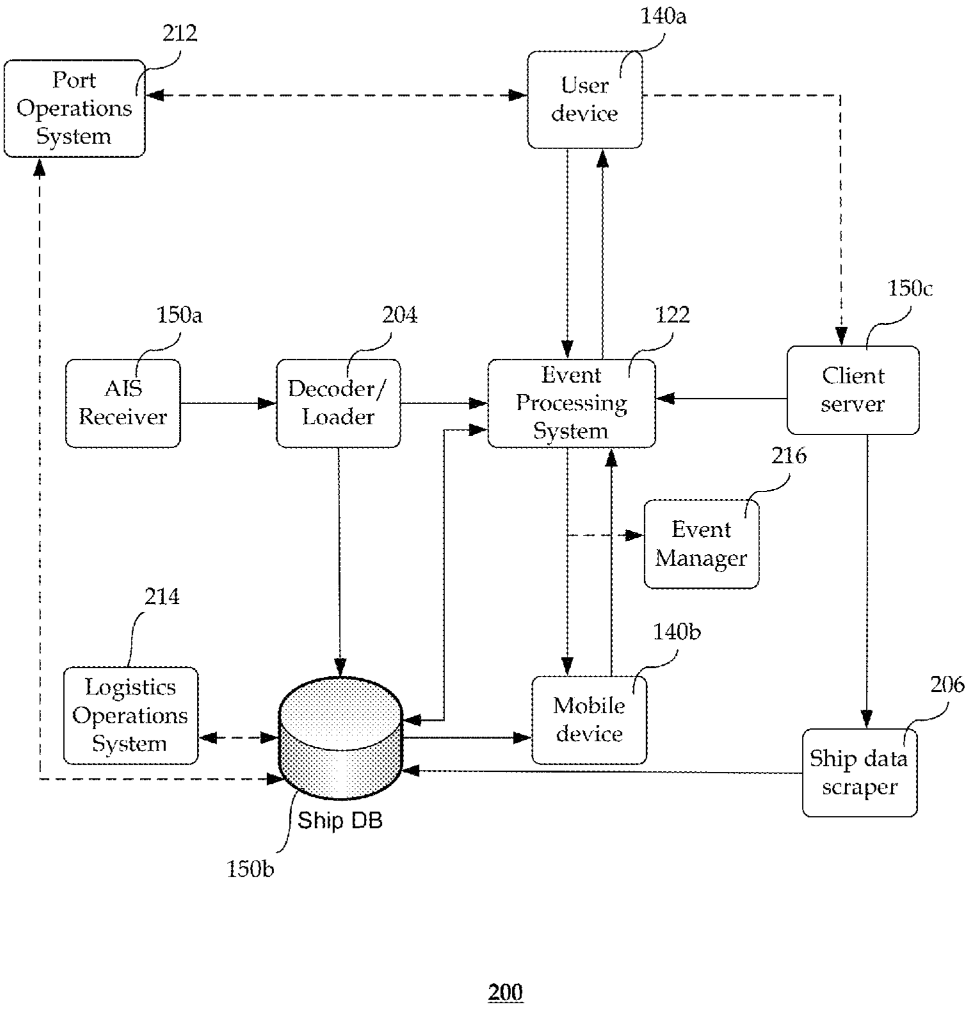
FIG. 2 is a block diagram illustrating an implementation of an exemplary system.

FIG. 2 is a more detailed block diagram of one implementation 200 of the system 100. As shown, the event processing system 122 is communicatively coupled to multiple user devices 140*a-b* and maritime data sources 150*a-c*. A domain expert may interact with the user device 140*a* to define constraints (or criteria) that identify an event as an event-of-interest. Other users, such as management personnel, may also interact with the user device 140*a* to receive reports (e.g., summaries, charts, visualization, etc.) on detected events-of-interest. The reports may indicate, for instance, the time, location and other details of the detected event-of-interest, the frequency of occurrence and/or other statistical information, etc.

In one implementation, the user device may be a mobile device 140*b*. The mobile device 140*b* may be used by, for instance, a port inspector for receiving notification of the occurrence of events-of-interest from the event processing system 122. Upon receiving such notification, the port inspector may investigate the event-of-interest by, for example, visiting the site of occurrence and physically investigating the relevant moving object. The port inspector may send reports of the status of the event-of-interest back to the event processing system 122 via their mobile device 140*b*. The event processing system 122 may then summarize such status updates and disseminate a report including the updates to the relevant personnel via, for example, the user device 140*a*.

In some implementations, the maritime data sources 150 include an AIS receiver 150*a*, a ship database (DB) 150*b*, and a client server 150*c*. It should be noted that other types of maritime data sources 150, such as a hydrological data source, a meteorological data source, Global Positioning Systems (GPS), Long Range Identification and Tracking (LRIT) systems, satellites, maritime radar systems, and/or other receivers, may also be used.

The AIS receiver (or transponder) 150*a* electronically collects information from AIS base stations and marine vessels in the vicinity. Such AIS information can be used to track and monitor vessel movement, and may include, for example, static vessel-specific information (e.g., unique identification, call sign, name, dimensions, ship type, etc.) as well as dynamic vessel information from the vessel's navigation system, such as current latitude/longitude position, course, speed-on-ground (SOG), rate-of-turn (ROT), destination, estimated time of arrival, previous ports of call, navigational status (e.g., berthed), and so forth. The AIS receiver 150*a* may be ship-based, land-based or installed on a satellite for long range detection.

In some implementations, the AIS receiver 150*a* sends the AIS information to the decoder/loader 204. The decoder/loader 204 may include an AIS message decoding software component that accepts and decodes the AIS information collected by the AIS receiver, and presents the decoded data in a form suitable for display and analysis by the event processing system 122 and/or the ship DB 150*b*. The decoding software component may decode, for example, all 27 AIS message types (e.g., position report types 1, 2 and 3, base station report type 4, etc.).

The decoder/loader 204 may further include a loading software component that loads the decoded data into the ship DB 150*b* and/or event processing system 122. The loading of decoded data may be performed in real-time, on-demand or periodically (e.g., at regular time intervals). A database schema (e.g., tables, fields, relationships, indexes, etc.) may be specified via the loading software component. The decoded data may then be organized in accordance with the schema prior to sending it to the ship DB 150*b* to be stored as historical data.

The ship DB 150*b* serves to store a comprehensive amount of information about the vessels, including operational information generated by the port operations system 212, logistics information generated by the logistics operations system 214, historical data from the loader/decoder 204 and event processing system 122, data from the ship data scraper 206, as well as other types of data. The ship DB 150*b* may be an in-memory database, as previously described with reference to server 101. The data stored in the ship DB 150*b* may be retrieved by, for example, the port operations system 212, the logistics operations system 214, the event processing system 122 and/or the mobile device 140*b*. The ship DB 150*b* may be located in a data warehouse or in a computing cloud.

The port operations system 212 may optionally be communicatively coupled to the user device 140*a* and the ship DB 150*b*. The port operations system 212 may provide an interface for accessing a data management system that manages port-related activities. In addition, the port operations system 212 may send real-time operational information (e.g., ship berthing schedules, task assignments, quay crane schedules, etc.) to the user device 140*a* for streamlining the processes so as to improve efficiency and productivity. The port operations system 212 may retrieve reports of detected events-of-interest from the ship DB 150*b* for display and/or aggregation. The port operations system 212 may also send operational information to the ship DB 150*b* for storage and subsequent retrieval.

Further, a logistics operations system 214 may optionally be communicatively coupled to the ship DB 150*b*. The logistics operations system 214 may provide an interface for accessing a logistics data management system that manages ground transportation (e.g. prime movers, container trucks, etc.). The logistics operations system 214 may send real-time logistics information (e.g., transportation schedule, truck capacity, etc.) to the ship DB 150*b* for storage and subsequent retrieval. In addition, the logistics operations system 214 may retrieve reports of detected events-of-interest from the ship DB 150*b* for display and/or aggregation. Further, the logistics operations system 214 may be communicatively coupled to an electronic marketplace so as to enable online bidding and/or contracting of logistics jobs.

In some implementations, the event processing system 122 receives data from various maritime data sources 150*a-c*. The data may be received via the decoder/loader 204. For instance, the event processing system 122 may collect decoded data from the decoder/loader 204. As discussed previously, the decoded data is associated with static and/or dynamic information of vessels that are in the vicinity of the AIS receiver 150*a*. Live decoded data streams may be collected from the decoder/loader 204 and processed in real-time. In addition, the event processing system 122 may also retrieve data previously stored in the ship DB 150*b*, including historical decoded AIS data, port operations and/or logistics operations data.

Further, the event processing system 122 may retrieve static and/or dynamic data from the client server 150*c*. The client server 150*c* may respond to requests from a client computer sent either through a local area network or a wide area network such as the Internet or World-Wide-Web (e.g., user-defined websites). The data retrieved from the client server 150*c* may include, for example, details of the type and size of vessels, port information, hydrological information (e.g., depth of water, obstacles below sea level, etc.), geographical information (e.g., maps, etc.), meteorological information (e.g., weather forecast reports, current weather conditions, weather advisory reports, historical weather data, etc.), flag information (e.g., country of origin), and so forth. The data from the client server 150*c* may be mined by a ship data scraper 206 and stored in the ship DB 150*b* for subsequent retrieval. The ship data scraper 206 serves to pre-process the server source data and extract relevant information or domain knowledge, such as social data (e.g., blogs, forums, discussions, other social media) or news related to the maritime industry, port, environment, previous regulatory violations or incidents (e.g., poaching, smuggling, pollution) in the vicinity, and so forth. It should be noted that other types of data or maritime data sources are also possible.

Once data is collected from one or more of the maritime data sources 150*a-c*, the event processing system 122 may process the data to detect events-of-interest. Different types of events-of-interest may be detected, as will be described in more detail in the subsequent sections. Reports of the detected events-of-interest may then be sent to the user device 140*a* and/or mobile device 140*b* for display to the respective stakeholders. In addition, reports of the detected events-of-interest may optionally be transmitted to an event manager 216.

The event manager 216 serves to manage and monitor detected events-of-interest. For example, the event manager 216 may track the status of an event-of-interest from the time it is first detected to the time it is "closed" (e.g., investigation has completed). The status of an event-of-interest may include information such as how the event was generated, constraints used in the detection process, person assigned to investigate the event, and so forth.

Based on the collected data and detection results, the event processing system 122 may perform analytics to generate maritime intelligence reports. The maritime intelligence report may include, for example, an estimate of the sea-lane projected to be traveled by a particular vessel or vessel type. Such sea-lane estimate is useful for recognizing abnormal motion behavior (e.g., vessels travelling in an unusual route) and unexpected location stops (e.g., vessels blocking sea traffic), which may be automatically flagged in the maritime intelligence report. The maritime intelligence report may also identify the names and relation of vessels (e.g., ships) involved in the detected event-of-interest in natural language (e.g., X polluted Y, X dumped Y, X sank). Further, the maritime intelligence report may also include structured information extracted from text, such as:

What is the incident?
Who is involved?
Where is it?
When did it happen?

The event processing system 122 may further use the data and detection results to facilitate planning of port operations. For example, the event processing system 122 may provide estimated time of arrival or travel time (e.g., from port to port or near time arrival, i.e., within a port) of each vessel based on its estimated sea-lane. The waiting time for each vessel within or near a port may also be estimated, and used to determine and recommend waiting locations for the vessels. In addition, optimization may be performed on port operations to plan vessel travel and/or parking so as to achieve better sea traffic control and efficient utilization of resources. For instance, an optimized route for a certain type of ship to travel to a port may be recommended. The optimal time, route and place for berthing a certain vessel may also be suggested. Optimization may also be performed to plan port logistics with improved efficiency. For example, the loading and unloading time for each vessel may be reduced by coordinating ships, prime movers and other mobile objects.

Figure 3A:
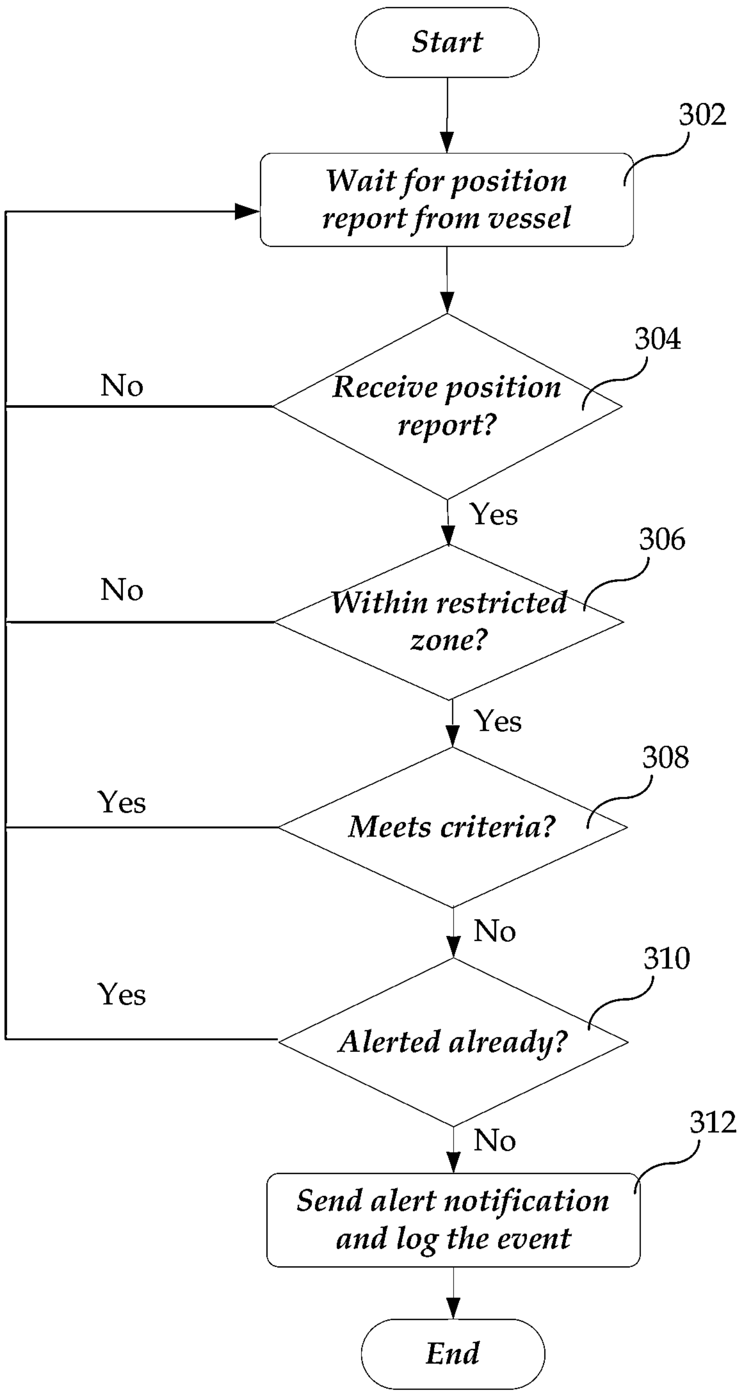
FIG. 3*a* shows an exemplary method of detecting a restricted zone violation event.

FIG. 3*a* shows an exemplary method 300 of detecting a restricted zone violation event. The method 300 may be implemented by the system 100, as previously described with reference to FIGS. 1 and 2. It should be noted that in the following discussion, reference will be made, using like numerals, to the features described in FIGS. 1 and 2.

At 302, the event processing system 122 waits for a position report from a vessel (e.g., ship). The position report may be in the form an AIS message or any other type of navigational sensor message from a maritime data source 150*a-c*. In some implementations, the position report may be received in substantially real-time from the AIS receiver 150*a* via the decoder/loader 204.

At 304, the event processing system 122 determines if the position report is received. Once received, at 306, the event processing system 122 determines whether the vessel is within a restricted zone. Examples of restricted zones include military training base, areas with shallow water or underwater obstacles, heavy traffic areas, mined areas, a region surrounding a fixed buoy, an area surrounded by pollutants, harmful radiations or chemicals, and so forth. A specific geographical area may be designated as a restricted zone by an access control policy or simply a constraint retrieved from the constraints module 126. The access control policies or constraints may be customized by a user via the user interface 142, as will be described in more detail later.

Figure 3B:
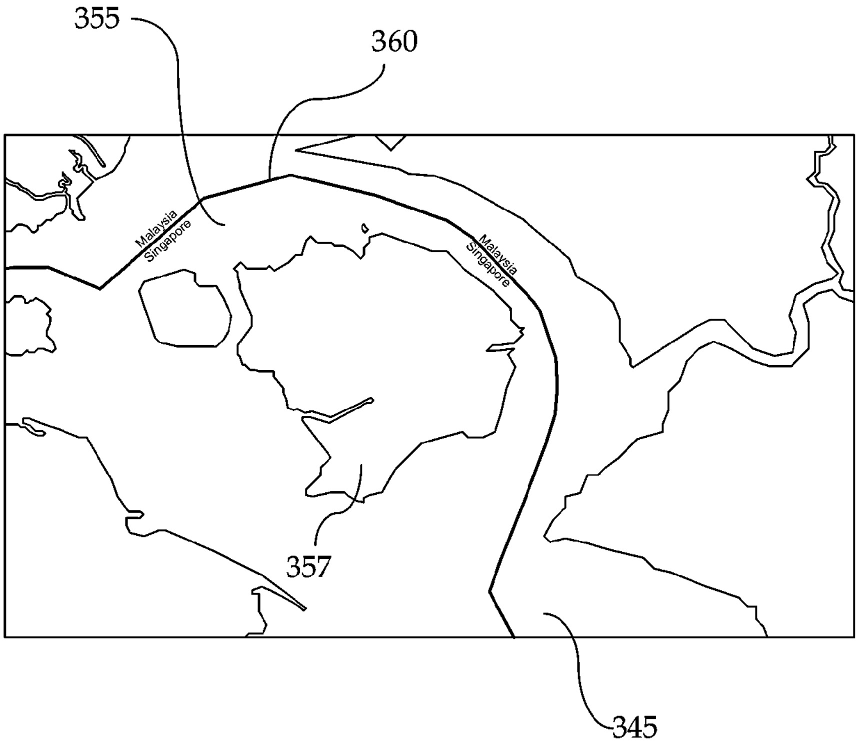
FIG. 3*b* shows a map of an exemplary restricted zone.

FIG. 3*b* shows a map 345 of an exemplary restricted zone 355. The map 345 shows the Pulau Tekong island 357, which is located in the north eastern region of Singapore, and used by the Singapore Armed Forces as a military training base. The restricted zone 355 includes the entire island 357 and its surrounding waters, which are strictly off-limits to civilians and civilian vessels. To determine if a vessel is within the restricted zone 355, the event processing system 122 compares the current location of the vessel with the coordinates of the boundary 360 defined by the access control policy. The current location of the vessel is provided by the AIS receiver 150*a* through the position reports and may be defined in a coordinate system that is shared with the coordinates of the boundary 360. Whenever the constraints on vessels are met as defined in the access control policy for the zone violations, the corresponding events are reported and logged appropriately.

Turning back to FIG. 3*a*, at 308, if the event processing system 122 determines that the vessel is within a restricted zone, it continues to determine if the ship meets certain rules or criteria pre-defined by the access control policy. Information about the vessel (e.g., type of ship) may be extracted from the AIS messages and used to determine if the vessel meets the pre-defined rules or criteria. Such information may also be extracted from other maritime data sources, such as the Ship DB 150*b*. The access control policy may include criteria information, such as the time period (e.g., 7 pm-7 am, etc.) that restriction is not enforced, characteristics of authorized vessels (e.g., military vessels), and so forth. For instance, in the example illustrated by FIG. 3*b*, the access control policy may include criteria information that permits military vessels access into the restricted zone 355. If a civilian vessel is detected in the restricted zone 355, the criterion is determined to be not met. In another example, the user may define a criterion that permits only container ships to access a restricted zone. If the event processing system 122 detects an oil tanker in the restricted zone, the criterion is determined to be not met. It is understood that other types of criteria are also useful.

At 310, if the vessel does not meet the pre-determined criteria, the event processing system 122 continues to determine if an alert notification regarding this detected event-of-interest (i.e. zone violation event) has already been sent. At 312, if no alert notification has previously been issued, the event processing system 122 proceeds to send an alert notification to the relevant stakeholders (e.g., management personnel or port inspector). The detected event-of-interest may then be logged in the ship DB 150*b*.

Figure 4:
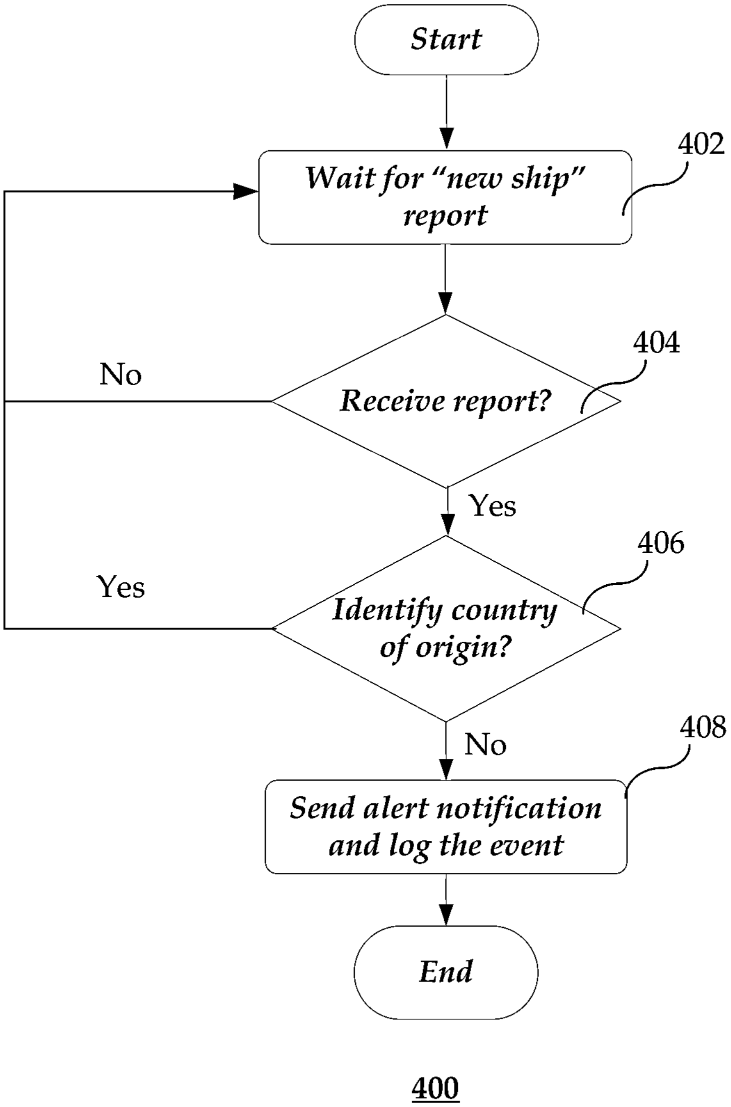
FIG. 4 shows an exemplary method of detecting a flag violation event.

FIG. 4 shows an exemplary method 400 of detecting a flag violation event. The method 400 may be implemented by the system 100, as previously described with reference to FIGS. 1 and 2. It should be noted that in the following discussion, reference will be made, using like numerals, to the features described in FIGS. 1 and 2.

At 402, the event processing system 122 waits for a "new ship" report. The "new ship" report may be in the form of an AIS message or any other type of tracking message from a maritime data source 150*a-c* that indicates the arrival of a new vessel at a port. In some implementations, the "new ship" report may be received in substantially real-time from the AIS receiver 150*a* via the decoder/loader 204.

At 404, the event processing system 122 determines if it has received the "new ship" report. If yes, it proceeds to 406 to parse the "new ship" report to determine if a country of origin (i.e. flag information) may be identified. The country of origin refers to the country in which the vessel is registered. Vessels that are unidentified or ambiguously identified may be indicative of a security threat, illegal activity or unauthorized entry.

At 408, if no country of origin has been identified, the event processing system 122 proceeds to send an alert notification to the respective stakeholders of the detected flag violation event. The detected event-of-interest may then be logged in the ship DB 150*b*.

Figure 5A:
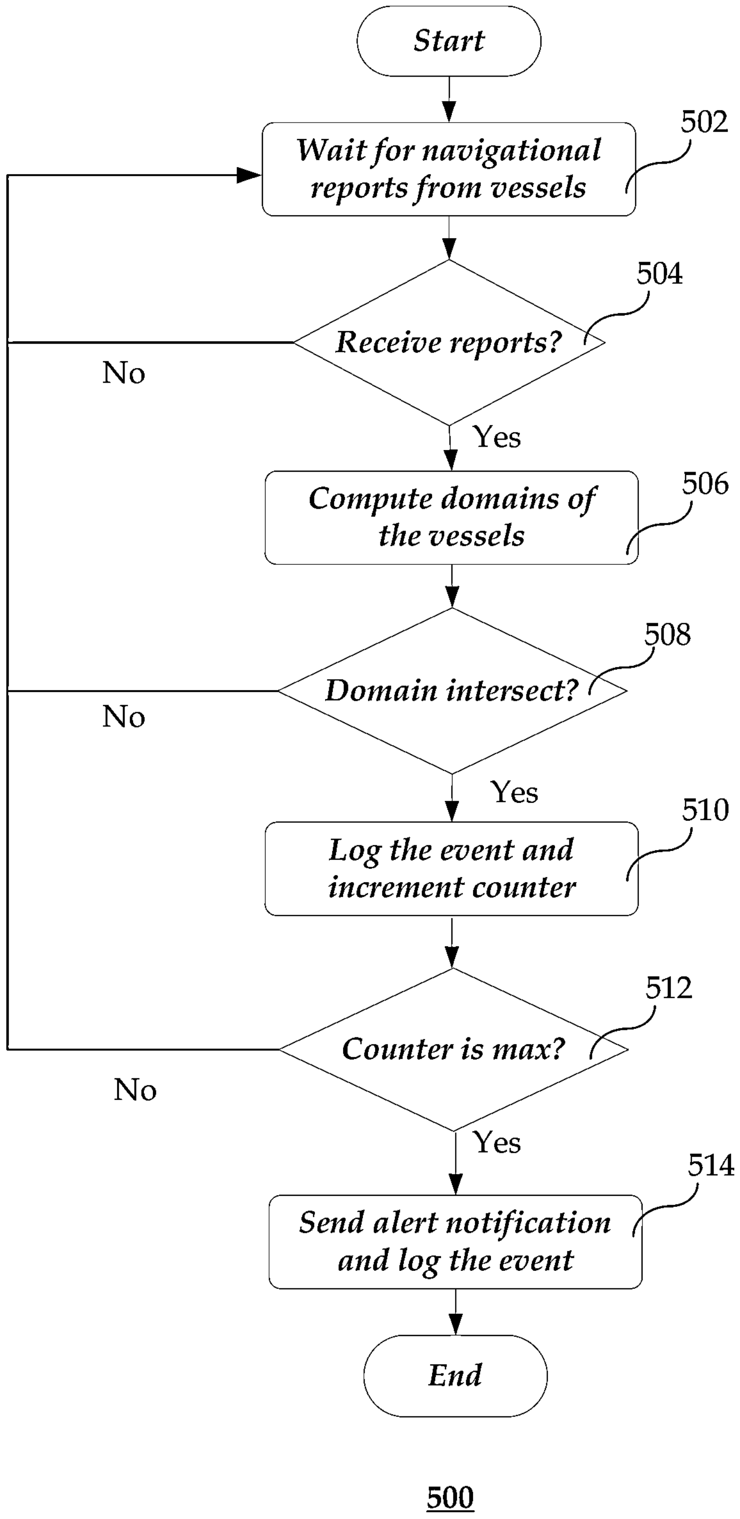
FIG. 5*a* shows an exemplary method of detecting a constant brushing event.

FIG. 5*a* shows an exemplary method 500 of detecting a constant brushing event. The method 500 may be implemented by the system 100, as previously described with reference to FIGS. 1 and 2. It should be noted that in the following discussion, reference will be made, using like numerals, to the features described in FIGS. 1 and 2.

At 502, the event processing system 122 waits for navigational reports associated with at least two vessels. The navigational reports may be in the form of an AIS message or any other type of tracking message from a maritime data source 150*a-c*. In some implementations, the navigational report may be received in substantially real-time from the AIS receiver 150*a* via the decoder/loader 204.

The navigational reports may be pre-processed to determine if the vessels are close enough for a brushing incident to occur. A brushing incident occurs when two vessels move very close to each other. "Brushing" does not necessarily mean that there is actual physical contact between the two vessels. However, it does indicate that the vessels are not maintaining their safety domains. A "safety domain" refers to an area around a vessel that no other vessel should enter, so as to avoid accidents. Constant brushing events may indicate traffic congestion (or navigational danger) as well as illegal activities that may be taking place. Navigational reports from vessels that are too far apart (or more than the pre-determined distance) from each other are not further processed by the method 500, since brushing between such vessels is unlikely.

At 504, the event processing system 122 determines if it has received the reports. If yes, it proceeds to 506 to compute, based on the navigational reports, a safety domain (or domain) for each vessel. The domain may be defined by a bounding area (two-dimensional), volume (three-dimensional) or hypervolume (higher dimensions) that completely contains the vessel. The domain may be represented by any geometrical shape, such as a circle, an ellipsoid, a square, a box, a polygon, a convex hull, etc. In detecting brushing, when two domains do not (or will not) intersect, then the contained vessels cannot brush either.

Figure 5B:
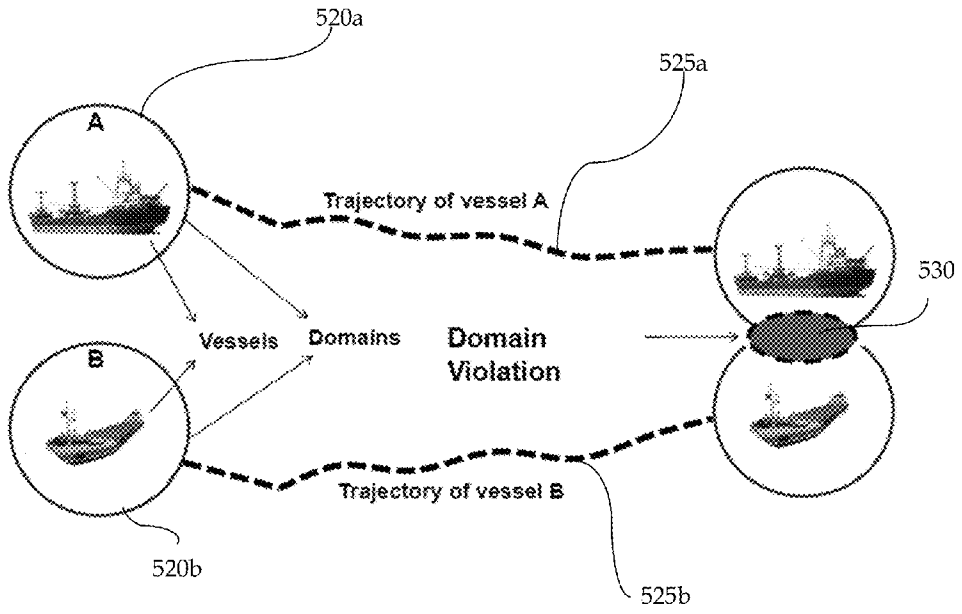
FIG. 5*b* illustrates an exemplary method of detecting a brushing incident between two vessels.

FIG. 5*b* illustrates an exemplary method of detecting brushing between two vessels (A and B). As shown, the domains 520*a-b* of each vessel is computed. Various types of algorithms known to one of ordinary skill in the art may be used to compute the domains 520*a-b*, such as the one proposed by N. Wang, X. Meng, Q. Xu, and Z. Wang, "A unified analytical framework for ship domains," Journal of Navigation, 62:643-655, 2009, which is herein incorporated by reference. The trajectories 525*a-b* of each vessel may then be computed. The trajectory is the path that the moving vessel follows through space as a function of time. The trajectory may be estimated based on the vessel's current speed and course, as well as other parameters, such as vessel's weight, wind speed and direction. Any suitable algorithm, such as a learning-based algorithm (e.g., evolutionary algorithm), may be used to model the vessel's trajectory. Once the trajectories 525*a-b* are determined, any intersection (or violation) 530 of the vessels' domains 520*a-b* along the trajectories 525*a-b* will indicate an imminent brushing incident. It should be noted that brushing incidents may also be computed based on historical data. Such historical data includes, for example, the paths (or trajectories) that have already been spanned by the vessels. These analytics are useful for investigation purposes, planning routes or port operations.

Referring back to FIG. 5*a*, at 508, if a domain intersection is detected, a brushing incident is determined to have occurred. At 510, the event processing system 122 logs the event in the ship DB 150*b* and increments a counter that keeps track of the number of brushing incidents for each vessel. At 512, if the counter has reached or exceeded a predetermined maximum value, at 514, a constant brushing event is detected. The event processing system 122 may proceed to send an alert notification to the respective stakeholders of the detected constant brushing event.

Figure 6:
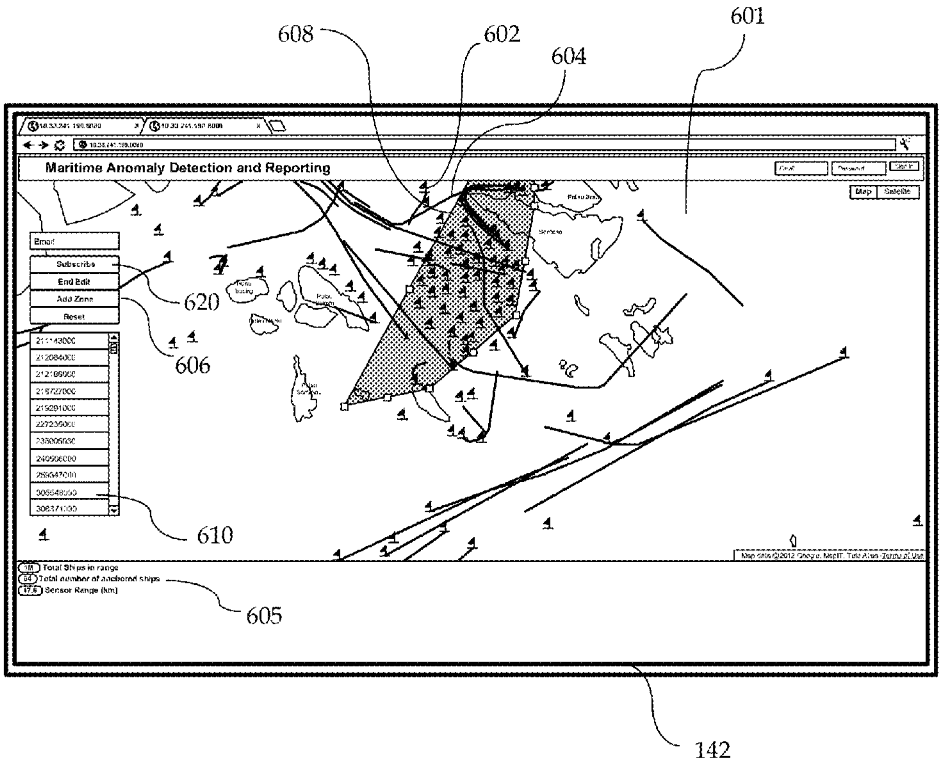
FIG. 6 shows an exemplary user interface.

FIG. 6 shows an exemplary user interface 142 in accordance with one implementation. The user interface 142 may be accessed via an internet browser, a mobile application, or any other viewing platform. The user interface 142 allows a user to interact with the event processing system 122, monitor and visualize activities detected within a specific geographic region.

In one implementation, the user interface 142 displays a map 601 that covers a specific geographic region that is being monitored. The map 601 may include graphical indicators 602 that represent vessels detected in the region. The map 601 may be updated in real-time to show the current positions of vessels, which may be moving or stationary. Estimated or current trajectories 604 of the detected vessels may also be plotted on the map 601. Further information (e.g., total number of ships in range, total number of anchored ships, sensor range, alert notification of events, port call, status change, voyage logs, news, etc.) of the vessels may be displayed in a text window 605.

The user interface 142 may include a menu 606 or any other user interface element that enables the user to add, edit or reset a zone for event processing. For example, the user can add a default zone by selecting an “Add Zone” menu button. The zone may be presented on the map 601 in the form of a polygon 608. The user may select and move, via an input device (e.g., mouse, touchpad, touchscreen, etc.), the points of the polygon 608 to cover the desired zone. In addition, the user may directly edit the coordinates of the polygon 608 displayed in the scroll bar 610 or any other user interface element.

Once the desired zone is selected, rules are applied on particular ships, and the user is notified of any events that are detected within the selected zone for those ships. The user may subscribe to the notification service by selecting the “Subscribe” menu button 620. The user may then be alerted when, for instance, a particular ship enters the selected zone designated by polygon 608. The user may choose to receive the alert notification via email, text message to a mobile device, facsimile, or any other communications means. The alert notification may also be presented on the map 601 or via the use interface 142. The event that triggers the notification alert may be customized according to the user’s preferences, as will be described in more detail later.

Figure 7A:
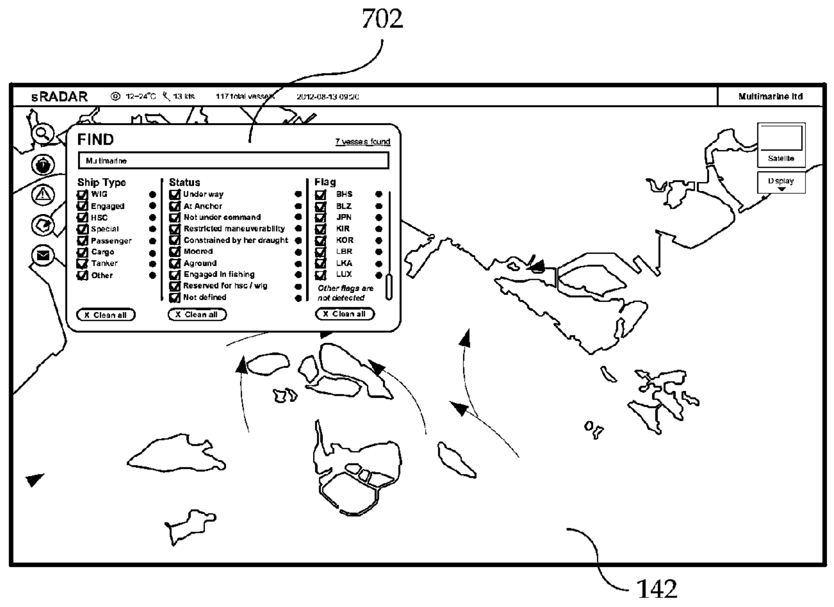
FIGS. 7*a-b* show other exemplary user interfaces.
Figure 7B:
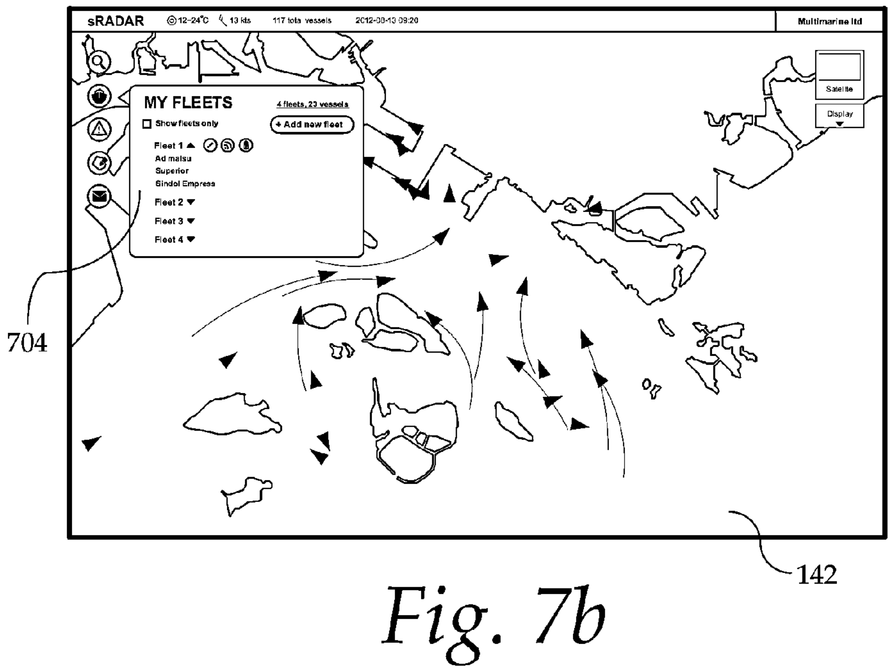

FIGS. 7*a-b* show exemplary user interfaces 142 that allow the user to search for a particular vessel or fleet of vessels. As shown in FIG. 7*a*, a user interface element (e.g., text box) 702 may be provided to allow a user to create, modify, and/or filter a search query. For example, a search engine may perform a search of available information based on one or more vessel names input by a user, and present search results to the user via the user interface 142. The user interface element 702 may also allow the user to “check off” or otherwise indicate which filters are to be applied to refine the search results. Exemplary filters include a particular ship type, a particular status and/or a particular flag. Further, as shown in FIG. 7*b*, another user interface element 704 may be provided to allow the user to add a desired fleet of vessels. The search engine may then return search results of selected fleets of vessels via the user interface 142.

The search results may be presented as graphical indicators 602 that represent vessels which satisfy the search criteria and/or text information in, for example, the text window 605, as discussed previously with reference to FIG. 6. The search results may also include, for example, any alert notification, port call, status change, voyage log, news, as well as other information associated with the selected vessel or fleet of vessels. For example, the user may investigate a marine accident involving a particular vessel by searching for the vessel by its name. Information about the vessel and details of the accident may be retrieved from the ship DB 150*b* and displayed via the user interface 142. This function serves as a powerful tool for port authorities, shipping companies, insurance companies and other relevant stakeholders in the port ecosystem.

Figure 8A:
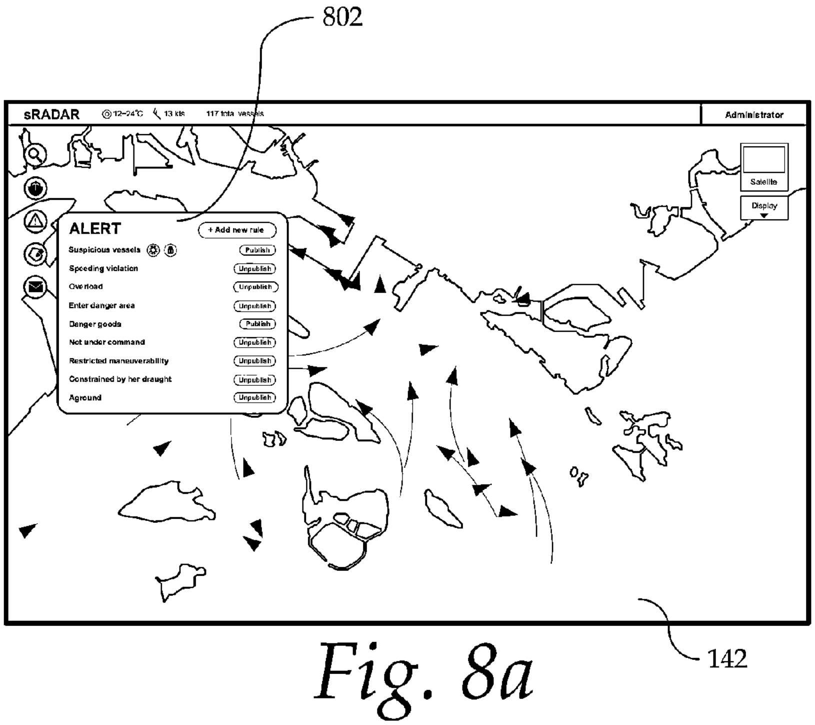
FIGS. 8*a-c* show exemplary user interfaces for detecting a brushing event.

FIG. 8*a* shows an exemplary user interface 142 that allows the user to select one or more events that trigger alert notifications. The user interface 142 may provide a text box 802 or any other user interface element that presents a list of events that may trigger an alert notification. Exemplary events include suspicious vessels, speeding violation, overload, entering danger area, danger goods, not under command, restricted maneuverability, constrained by draught, aground, and so forth.

Figure 8B:
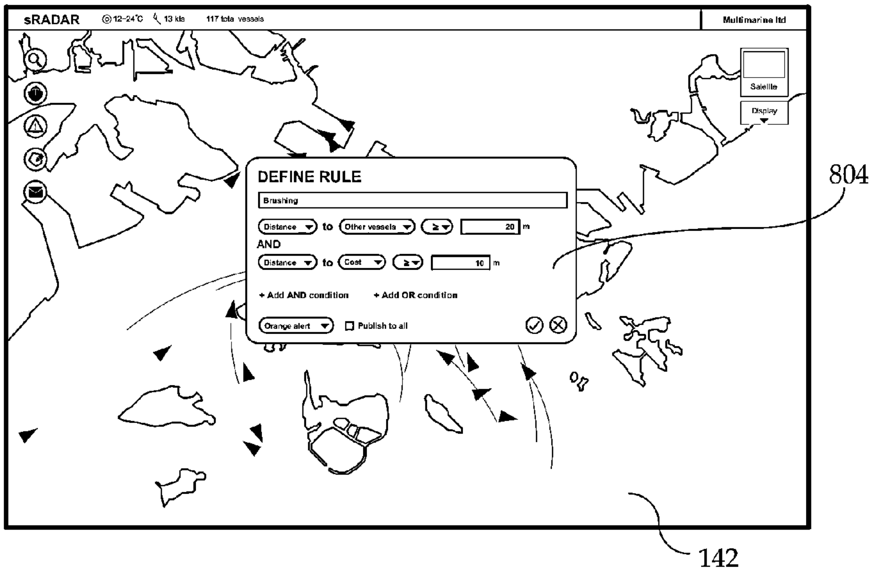

FIG. 8*b* shows an exemplary user interface 142 that enables a user to customize the rules (or constraints) associated with a brushing event. In one implementation, the user interface 142 includes a text box 804 or any other user interface element for defining a rule associated with the brushing event. The rule may include multiple conditions, such as AND, OR, NOT, distance to other vessels, coast or any other object, and so forth.

Figure 8C:
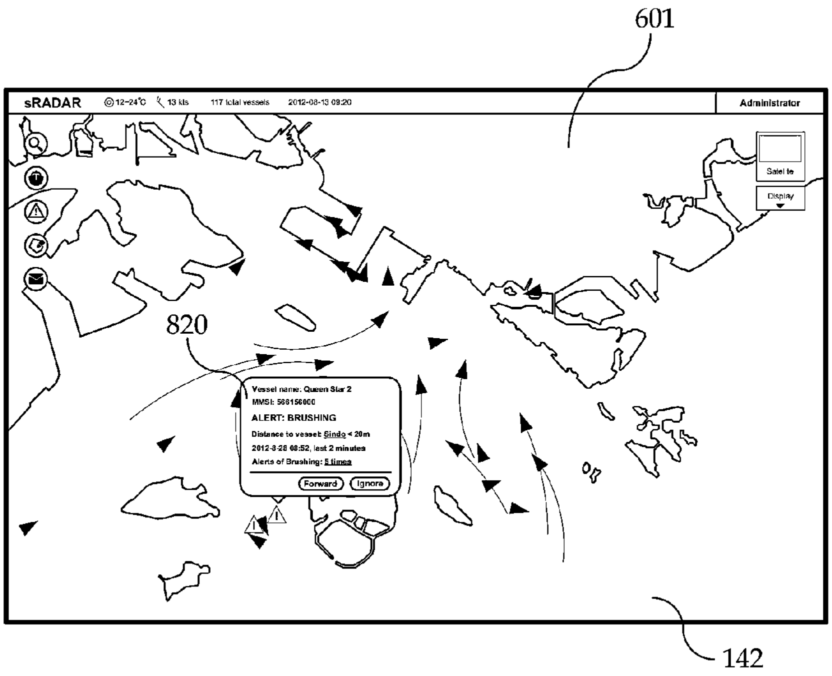

Once the events are selected and/or defined, the event processing system 122 may monitor the zone and issue alert notifications upon detecting the occurrences of such events. FIG. 8*c* shows an exemplary alert notification 820 displayed via the user interface 142. The alert notification 820 may be sent in real-time to provide insight to relevant stakeholders when needed. As shown, the alert notification 820 may indicate on the map where the brushing event occurred. The alert notification 820 may include information about the detected brushing event, such as the brushing vessel name, the Maritime Mobile Service Identity (MMSI) number, the nature of the event (e.g., brushing), the distance to the other vessel, the time of occurrence and the number of brushing alerts issued. The user may choose to ignore or forward the alert notification via email or other communications means.

Figure 9A:
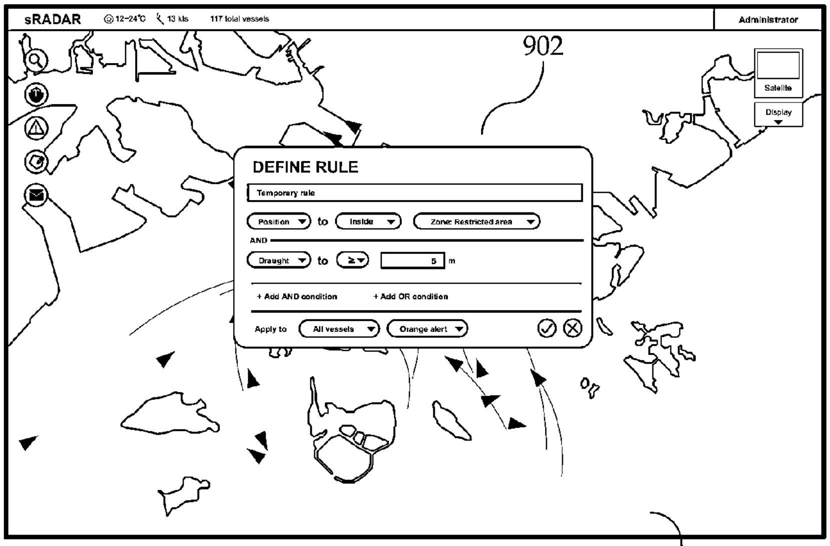
FIGS. 9*a-c* show exemplary user interfaces for detecting a restricted zone violation event.

FIG. 9*a* shows an exemplary user interface 142 that enables a user to customize the rules (or constraints) associated with a restricted zone violation event. In one implementation, the user interface 142 includes a text box 902 for defining a constraint (or access control policy) associated with the restricted zone violation event. The user may customize, for instance, the position of the vessel (e.g., inside) relative to the restricted zone, the draught of the vessel, and other conditions.

Figure 9B:
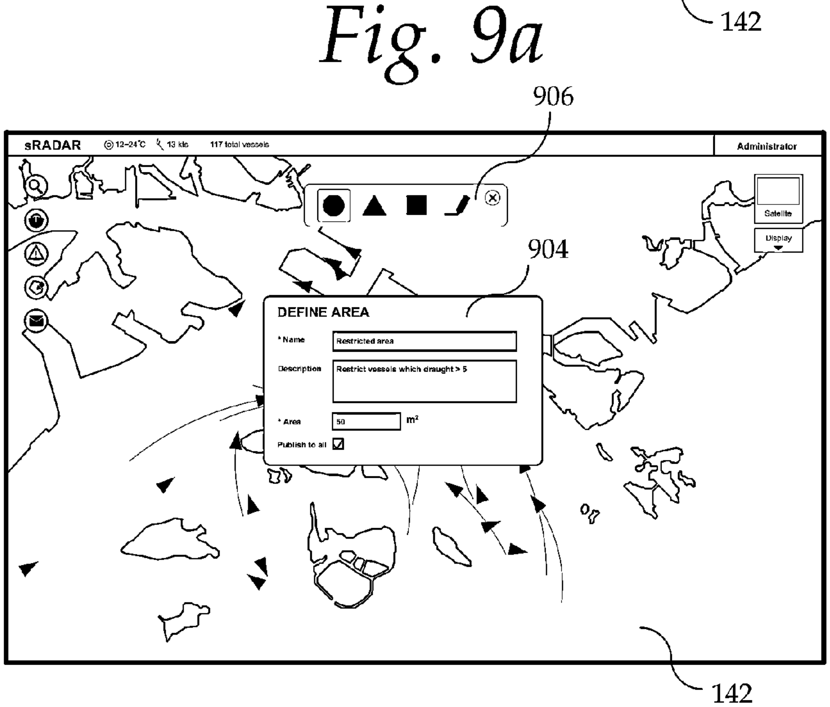

FIG. 9*b* shows the exemplary user interface 142 that allows the user to define the restricted zone. In one implementation, the user interface 142 includes a text box 904 that enables the user to define the attributes of the restricted zone, such as its name, description, area, etc. The shape (e.g., circular, triangular, square, polygonal) of the restricted zone may be selected via the menu 906.

Figure 9C:
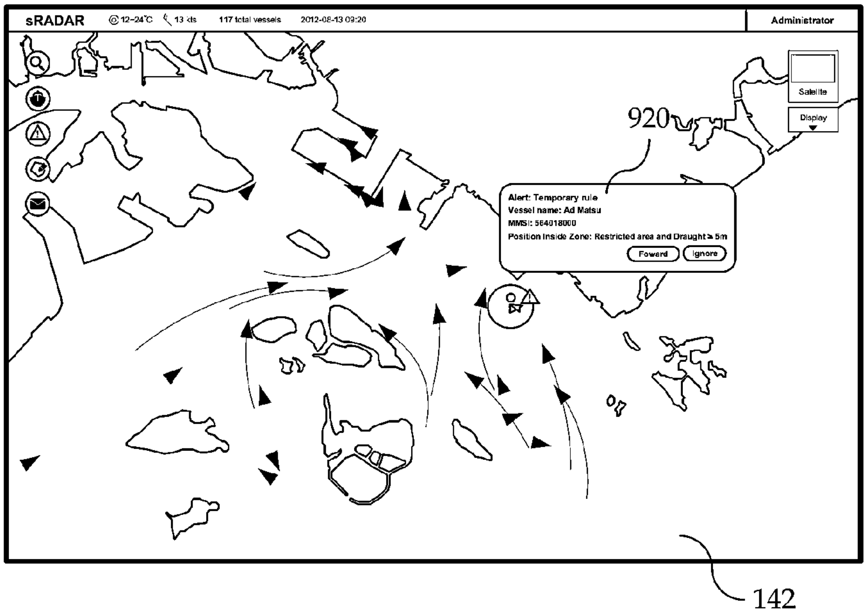

FIG. 9*c* shows an exemplary alert notification 920 displayed via the user interface 142. As shown, the alert notification 920 may indicate on the map where the restricted zone violation event occurred. The alert notification 920 may include information about the restricted zone violation event, such as the unauthorized vessel name, the Maritime Mobile Service Identity (MMSI) number, the nature of the violation (e.g., position inside restricted area and draught≥5 m), and other relevant information.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of detecting a constant brushing event comprising:

receiving, at a remote server, navigational reports associated with at least two vessels;

decoding, by the remote server, the navigational reports into a form for display and analysis;

computing, by the remote server based on the navigational reports, a domain and a trajectory for each of the two vessels;

determining, by the remote server, a brushing incident by detecting an intersection of the domains of the two vessels along the trajectories; and in response to determining a number of brushing incidents exceeding a predetermined maximum number, wirelessly transmitting , by the remote server, a report of the brushing incidents to one or more mobile devices remote from the server and the at least two vessels.

2. A computer-implemented method of complex event processing comprising:

receiving at a remote server, from multiple data sources, data associated with one or more moving objects;

decoding, by the remote server, the data into a form for display and analysis;

determining, by the remote server, one or more constraints associated with an event-of-interest;

determining, by the remote server based on the data, the event-of-interest that satisfies the one or more constraints;

optimizing, by the remote server and based on the determined event-of-interest, port operations including determining an optimized time, route or place for berthing one or more vessels; and wirelessly sending a notification of the determined event-of-interest to one or more mobile devices remote from the server and the one or more moving objects.

3. The computer-implemented method of claim 2 further comprising storing the data in an in-memory database.

4. The computer-implemented method of claim 2 wherein receiving the data associated with the one or more moving objects comprises receiving live data from at least one automatic identification system (AIS) receiver.

5. The computer-implemented method of claim 2 wherein receiving the data associated with the one or more moving objects comprises receiving data from an Internet server source.

6. The computer-implemented method of claim 2 wherein receiving the data associated with the one or more moving objects comprises receiving hydrological or meteorological data.

7. The computer-implemented method of claim 2 wherein determining the event-of-interest that satisfies the one or more constraints comprises determining an event-of-interest that is a precursor to one or more incidents that are likely to occur in the absence of a preventive measure.

8. The computer-implemented method of claim 2 further comprising tracking a status of the determined event-of-interest and transmitting text or graphical updates to the one or more mobile devices.

9. The computer-implemented method of claim 2 wherein sending the notification of the determined event-of-interest comprises sending a maritime intelligence report that identifies one or more vessels involved in the determined event-of-interest.

10. The computer-implemented method of claim 2 further comprising sending the notification of the determined event-of-interest to a port operations system.

11. The computer-implemented method of claim 2 further comprising sending the notification of the determined event-of-interest to a logistics operations system.

12. The computer-implemented method of claim 2 wherein determining the event-of-interest that satisfies the one or more constraints comprises determining a restricted zone violation event.

13. The computer-implemented method of claim 12 wherein determining the one or more constraints associated with the event-of-interest comprises receiving from a user, via a user interface of the one or more mobile devices, user input that specifies an access control policy, wherein the access control policy designates a specific area as a restricted zone.

14. The computer-implemented method of claim 2 wherein determining the event-of-interest that satisfies the one or more constraints comprises determining a flag violation event.

15. The computer-implemented method of claim 2 wherein determining the event-of-interest that satisfies the one or more constraints comprises determining a constant brushing event.

16. The computer-implemented method of claim 2 wherein determining the one or more constraints associated with the event-of-interest comprises receiving from a user, via a user interface of the one or more mobile devices, user input that defines the one or more constraints.

17. The computer-implemented method of claim 2 wherein determining the one or more constraints associated with the event-of-interest comprises automatically retrieving, from an in-memory database, the one or more constraints.

18. The computer-implemented method of claim 2 wherein sending the notification of the determined event-of-interest comprises displaying, on a map, the notification that indicates a location of the determined event-of-interest.

19. A non-transitory computer-readable medium having stored thereon program code, the program code executable by a processor to:

receive at a remote server, from multiple data sources, data associated with moving objects;

decode, by the remote server, the data into a form for display and analysis;

determine, by the remote server, one or more constraints associated with an event-of-interest;

determine, by the remote server based on the data, the event-of-interest that satisfies the one or more constraints;

optimize, by the remote server and based on the determined event-of-interest, port operations including determining an optimized time, route or place for berthing one or more vessels; and wirelessly send, by the remote server, a notification of the determined event-of-interest to one or more mobile devices remote from the server and the one or more moving objects.

20. A wireless communications system including a complex event processing system, comprising:

a communications device;

a non-transitory memory device for storing computer-readable program code; and a processor in communication with the memory device, the processor being operative with the computer-readable program code to:

receive, from multiple data sources, data associated with moving objects;

determine one or more constraints associated with an event-of-interest;

determine, based on the data, the event-of-interest that satisfies the one or more constraints;

optimize, based on the determined event-of-interest, port operations including determining an optimized time, route or place for berthing one or more vessels; and send, using the communications device, a notification of the determined event-of-interest to one or more mobile devices remote from the processor and the moving objects.

* * * * *